United States Patent
Wang et al.

(10) Patent No.: US 12,432,475 B2
(45) Date of Patent: Sep. 30, 2025

(54) DIGITAL PIXEL ARCHITECTURE SUPPORTING LOW POWER AND HIGH DYNAMIC RANGE OPERATION HAVING A COUNTER THAT STOPS COUNTING PULSES IN RESPONSE TO DETECTING A VOLTAGE ON A CAPACITOR EXCEEDING A THRESHOLD

(71) Applicant: Raytheon Company, Waltham, MA (US)

(72) Inventors: Zhenwu Wang, Moorpark, CA (US); Angelika Rutz, Newbury Park, CA (US)

(73) Assignee: Raytheon Company, Arlington, VA (US)

( * ) Notice: Subject to any disclaimer, the term of this patent is extended or adjusted under 35 U.S.C. 154(b) by 258 days.

(21) Appl. No.: 18/302,641

(22) Filed: Apr. 18, 2023

(65) Prior Publication Data
US 2024/0357261 A1    Oct. 24, 2024

(51) Int. Cl.
  *H04N 5/335*    (2011.01)
  *H04N 25/76*    (2023.01)
  *H04N 25/77*    (2023.01)
  *H04N 25/78*    (2023.01)

(52) U.S. Cl.
  CPC ............. *H04N 25/78* (2023.01); *H04N 25/77* (2023.01); *H04N 25/7795* (2023.01)

(58) Field of Classification Search
  CPC ....................................................... H04N 5/78
  See application file for complete search history.

(56) References Cited

U.S. PATENT DOCUMENTS

| 5,624,848 A | * | 4/1997 | Marnie ................ G01N 21/783 436/164 |
| 6,121,843 A | | 9/2000 | Vampola et al. |
| 6,252,462 B1 | | 6/2001 | Hoffman |

(Continued)

FOREIGN PATENT DOCUMENTS

| CN | 102523394 B | 4/2014 |
| CN | 107563202 B | 12/2020 |

(Continued)

OTHER PUBLICATIONS

Salem et al., "A Review of: Digital-Pixel Focal PlaNe Array Technology, Schultz et al., MIT Lincoln Laboratory Journal 2014," Oct. 2016, 7 pages.

(Continued)

*Primary Examiner* — Gary C Vieaux

(57) ABSTRACT

A system includes a focal plane array having multiple pixel circuit elements. Each pixel circuit element includes a photodetector configured to generate an electrical current based on received illumination. Each pixel circuit element also includes a capacitor configured to be charged by the electrical current and generate a voltage. Each pixel circuit element further includes a controller configured to sense whether the voltage on the capacitor exceeds a threshold during a sampling period. In addition, each pixel circuit element includes a timer configured to generate an estimate or measure of an amount of time within the sampling period during which the voltage on the capacitor does not exceed the threshold.

20 Claims, 3 Drawing Sheets

(56) References Cited

U.S. PATENT DOCUMENTS

| | | | |
|---|---|---|---|
| 6,885,002 B1 | 4/2005 | Finch et al. | |
| 6,927,796 B2 | 8/2005 | Liu et al. | |
| 7,148,727 B2 | 12/2006 | Van Bogget | |
| 7,326,903 B2 | 2/2008 | Ackland | |
| 7,333,129 B2* | 2/2008 | Miller | G08B 29/188 |
| | | | 348/162 |
| 7,812,755 B2 | 10/2010 | Vampola et al. | |
| 9,621,829 B1 | 4/2017 | Boemler | |
| 9,628,105 B1 | 4/2017 | Veeder | |
| 10,242,268 B2 | 3/2019 | Harris et al. | |
| 10,447,293 B1* | 10/2019 | Hairston | H04N 25/57 |
| 10,530,380 B2 | 1/2020 | Beuville et al. | |
| 11,258,977 B2 | 2/2022 | Lule | |
| 11,496,701 B2 | 11/2022 | Cantrell | |
| 11,843,355 B2 | 12/2023 | Kean et al. | |
| 12,029,599 B2 | 7/2024 | Cao et al. | |
| 2003/0150979 A1 | 8/2003 | Lauffenburger et al. | |
| 2004/0008136 A1 | 1/2004 | Reyneri et al. | |
| 2005/0168602 A1 | 8/2005 | Sumi et al. | |
| 2005/0199813 A1 | 9/2005 | Van Bogget | |
| 2008/0106297 A1 | 5/2008 | Jao | |
| 2008/0218614 A1 | 9/2008 | Joshi et al. | |
| 2011/0221520 A1 | 9/2011 | Bales | |
| 2012/0261553 A1 | 10/2012 | Elkind et al. | |
| 2012/0305786 A1 | 12/2012 | Dierickx | |
| 2013/0187028 A1 | 7/2013 | Salvestrini et al. | |
| 2014/0061472 A1 | 3/2014 | Salvestrini et al. | |
| 2017/0205283 A1 | 7/2017 | Wyles et al. | |
| 2018/0124336 A1* | 5/2018 | Jonas | H04N 25/59 |
| 2019/0313046 A1 | 10/2019 | McGee, III et al. | |
| 2019/0334541 A1 | 10/2019 | Beuville et al. | |
| 2019/0335118 A1 | 10/2019 | Simolon et al. | |
| 2021/0029286 A1* | 1/2021 | Liu | H04N 23/73 |
| 2022/0311960 A1 | 9/2022 | Cantrell | |
| 2023/0095511 A1 | 3/2023 | Boemler | |
| 2023/0269502 A1 | 8/2023 | Black et al. | |

FOREIGN PATENT DOCUMENTS

| | | |
|---|---|---|
| CN | 115876320 A | 3/2023 |
| CN | 115914872 B | 3/2024 |
| TW | I287818 B | 10/2007 |

OTHER PUBLICATIONS

Abbasi et al., "A PFM based Digital Pixel with Off-Pixel Residue Measurement for 15μm Pitch MWIR FPAs," Proc. of SPIE, vol. 9819, Infrared Technology and Applications XLII, May 2016, 7 pages.

Trepanier et al., "A Wide Dynamic Range CMOS Digital Pixel Sensor," 45th Midwest Symposium on Circuits and Systems, 2002, 4 pages.

Abbasi et al., "A PFM-Based Digital Pixel with Off-Pixel Residue Measurement for Small Pitch FPAs," IEEE Transactions on Circuits and Systems—II: Express Briefs, vol. 64, No. 8, Aug. 2017, 5 pages.

Ogi et al., "Analog and 15-b digital Output Image Sensor for Wide Dynamic Range," 2005 IEEE Workshop on Charge-Coupled Devices and Advanced Image Sensors, Jun. 2005, 4 pages.

Brown et al., "Digital-pixel focal plane array development," Proc. of SPIE, vol. 7608, Quantum Sensing and Nanophotonic Devices, Jan. 2010, 11 pages.

Kean et al., "High-Energy Suppression for Capacitor Transimpedance Amplifier (CTIA)-Based Imagers or Other Imaging Devices," U.S. Appl. No. 17/649,994, filed Feb. 4, 2022, 30 pages.

Kean, "Artifact Mitigation in Capacitor Transimpedance Amplifier (CTIA)-Based Imagers Or Other Imaging Devices," U.S. Appl. No. 18/165,663, filed Feb. 7, 2023, 36 pages.

Kean, "High Flux Detection and Imaging Using Capacitor Transimpedance Amplifier (CTIA)-Based Unit Cells in Imaging Devices," U.S. Appl. No. 18/165,713, filed Feb. 7, 2023, 49 pages.

Bisiaux et al., "A 14-b Two-step Inverter-based ΣΔ ADC for CMOS Image Sensor," 15th IEEE International New Circuits and Systems Conference, Nov. 2017, 4 pages.

Non-Final Office Action dated Apr. 19, 2023 in connection with U.S. Appl. No. 17/480,554, 11 pages.

Notice of Allowance dated Mar. 15, 2023 in connection with U.S. Appl. No. 17/649,994, 9 pages.

Notice of Allowance dated Jun. 28, 2023 in connection with U.S. Appl. No. 17/649,994, 8 pages.

Notice of Allowance dated Oct. 3, 2023 in connection with U.S. Appl. No. 17/480,554, 13 pages.

Non-Final Office Action dated Jan. 3, 2024 in connection with U.S. Appl. No. 18/165,713, 6 pages.

Non-Final Office Action dated Apr. 9, 2024 in connection with U.S. Appl. No. 18/165,713, 7 pages.

Non-Final Office Action dated Jun. 18, 2024 in connection with U.S. Appl. No. 18/165,663, 9 pages.

Final Office Action dated Jul. 19, 2024 in connection with U.S. Appl. No. 18/165,713, 8 pages.

Notice of Allowance dated Jan. 13, 2025 in connection with U.S. Appl. No. 18/165,663, 9 pages.

\* cited by examiner

DIGITAL PIXEL ARCHITECTURE SUPPORTING LOW POWER AND HIGH DYNAMIC RANGE OPERATION HAVING A COUNTER THAT STOPS COUNTING PULSES IN RESPONSE TO DETECTING A VOLTAGE ON A CAPACITOR EXCEEDING A THRESHOLD

TECHNICAL FIELD

This disclosure relates generally to imaging systems. More specifically, this disclosure relates to a digital pixel architecture having low power, high dynamic range, and/or efficient pixel area utilization.

BACKGROUND

Digital imaging systems often use digital pixels to capture image information representing scenes being imaged. For example, a pure digital pixel architecture may use a photocurrent-to-frequency converter to convert an electrical current from a photodetector into a corresponding digital signal. While a pure digital pixel architecture can provide high dynamic range, the pure digital pixel architecture suffers from flux-dependent power consumption. In other words, the pure digital pixel architecture consumes more electrical power when the scene being imaged is bright. This flux-dependent power consumption can create extremely high current draws when bright scenes are being imaged using an array of pure digital pixels, and the current draws might actually damage electrical components or prevent usage of the pure digital pixel architectures in certain applications. A residue digital pixel architecture may not experience flux-dependent power consumption, but the residue digital pixel architecture typically has a lower dynamic range compared to the pure digital pixel architecture.

SUMMARY

This disclosure relates to a digital pixel architecture having low power, high dynamic range, and/or efficient pixel area utilization.

In a first embodiment, an apparatus includes a photodetector configured to generate an electrical current based on received illumination. The apparatus also includes a capacitor configured to be charged by the electrical current and generate a voltage. The apparatus further includes a controller configured to sense whether the voltage on the capacitor exceeds a threshold during a sampling period. In addition, the apparatus includes a timer configured to generate an estimate or measure of an amount of time within the sampling period during which the voltage on the capacitor does not exceed the threshold.

In a second embodiment, a system includes a focal plane array having multiple pixel circuit elements. Each pixel circuit element includes a photodetector configured to generate an electrical current based on received illumination. Each pixel circuit element also includes a capacitor configured to be charged by the electrical current and generate a voltage. Each pixel circuit element further includes a controller configured to sense whether the voltage on the capacitor exceeds a threshold during a sampling period. In addition, each pixel circuit element includes a timer configured to generate an estimate or measure of an amount of time within the sampling period during which the voltage on the capacitor does not exceed the threshold.

In a third embodiment, a method includes generating an electrical current based on received illumination. The method also includes charging a capacitor using the electrical current to generate a voltage and measuring the received illumination during a sampling period. The method further includes sensing that the voltage on the capacitor exceeds a threshold during the sampling period and generating an estimate or measure of an amount of time within the sampling period during which the voltage on the capacitor does not exceed the threshold. In addition, the method includes generating a final value indicative of the received illumination based on the measuring of the received illumination and the estimate or measure of the amount of time within the sampling period during which the voltage on the capacitor does not exceed the threshold.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

Figure 1:
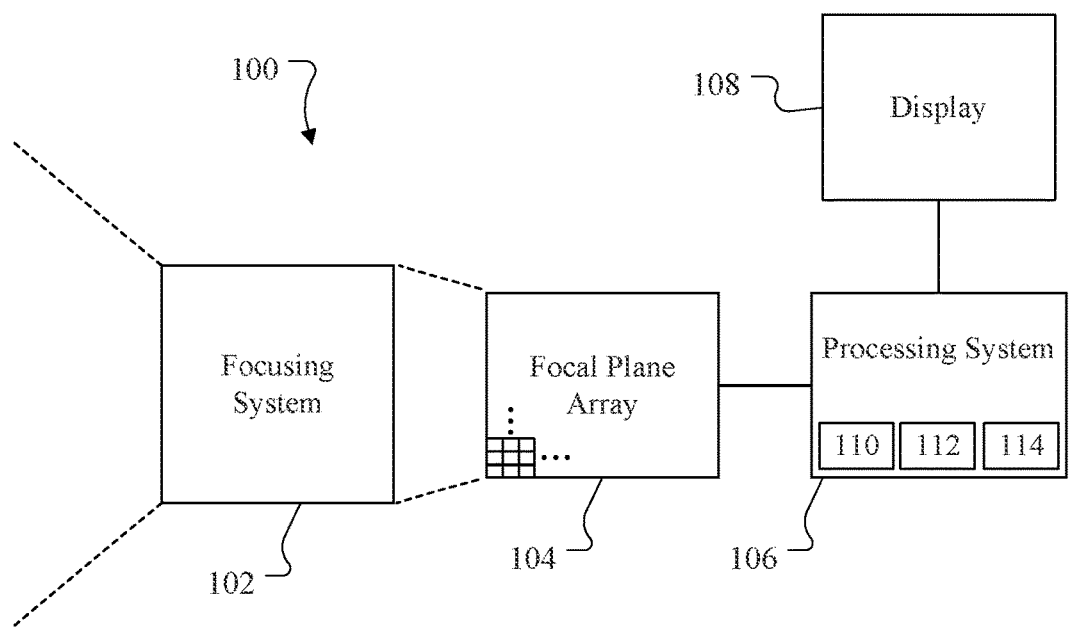
FIG. 1 illustrates an example system supporting the use of a digital pixel architecture having low power and high dynamic range according to this disclosure.

FIGS. 1 through 4, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, digital imaging systems often use digital pixels to capture image information representing scenes being imaged. For example, a pure digital pixel architecture may use a photocurrent-to-frequency converter to convert an electrical current from a photodetector into a corresponding digital signal. While a pure digital pixel architecture can provide high dynamic range, the pure digital pixel architecture suffers from flux-dependent power consumption. In other words, the pure digital pixel architecture consumes more electrical power when the scene being imaged is bright. This flux-dependent power consumption can create extremely high current draws when bright scenes are being imaged using an array of pure digital pixels, and the current draws might actually damage electrical components or prevent usage of the pure digital pixel architectures in certain applications. A residue digital pixel architecture may not experience flux-dependent power consumption, but the residue digital pixel architecture typically has a lower dynamic range compared to the pure digital pixel architecture.

This disclosure provides a digital pixel architecture having low power and high dynamic range. As described in more detail below, the digital pixel architecture includes a capacitor that is charged based on electrical current from a photodetector. A comparator compares the voltage stored on the capacitor with a reference voltage, and the comparator generates a digital output based on the comparison. When the capacitor voltage equals or exceeds the reference voltage, the comparator toggles its output, and the capacitor is reset (causing the comparator to toggle its output again). As a result, the digital output generated by the comparator contains pulses, and the number of pulses varies based on the amount of illumination or flux received by the photodetector.

The digital pixel architecture uses a data counter to count the number of pulses contained in the digital output generated by the comparator, and the data counter can represent a higher-resolution counter (such as a 14-bit or 15-bit counter). In some cases, the digital pixel architecture also uses a time counter to count a number of pulses contained in a clock signal, and the time counter can represent a lower-resolution counter (such as a 3-bit or 4-bit counter). The clock signal may contain nonlinearly-spaced pulses, such as when the pulses in the clock signal have a spacing that increases exponentially during a sampling period. If and when the data counter reaches or exceeds a specified threshold value that is indicative of the digital pixel architecture receiving a large flux, the time counter can be stopped. In other cases, an analog time counter may be used and stopped if and when the data counter reaches or exceeds the specified threshold value. In these approaches, the time counter provides an approximate or actual indication of the amount of time that it takes for the threshold value to be reached during the sampling period. The counting of pulses by the data counter can also be stopped in response to the data counter reaching or exceeding the specified threshold value. The count value generated by the data counter and the count value or time generated by the time counter can be output and further processed, such as by latching the values and reading the latched values during subsequent column read operations or other operations.

If the specified threshold value is never reached or exceeded by the data counter during the sampling period, the count value from the data counter may be used as an indication of the amount of flux received by the photodetector during the sampling period. If the specified threshold value is reached or exceeded by the data counter during the sampling period, the count value from the data counter can be scaled based on the count value or time measured by the time counter in order to determine an extrapolated value that is indicative of the amount of flux received by the photodetector during the sampling period. For instance, if the time counter outputs information indicating that the specified threshold value was reached or exceeded by the middle of the sampling period, the count value from the data counter can be doubled. If the time counter outputs information indicating that the specified threshold value was reached or exceeded by a quarter of the sampling period, the count value from the data counter can be quadrupled. Note that the process described above may be repeated for any number of sampling periods.

In this way, the digital pixel architecture of this disclosure is able to support a flux-dependent integration time scaling scheme. That is, the amount of time spent integrating the pulses from the comparator of the digital pixel architecture can vary based on the amount of flux being received. If high flux causes the data counter to output a count value meeting or exceeding the specified threshold value, counting can be stopped, and the count value from the data counter and the time or count value from the time counter can be used to extrapolate the number of pulses that the data counter might have counted had the data counter been allowed to count pulses for the entire sampling period.

This allows the digital pixel architecture to only perform integration for a portion of a typical sampling time during high-flux conditions, and the amount of time spent integrating can vary inversely with the flux (so higher flux conditions result in shorter integration times and vice versa). This can lead to significant power reductions while still allowing suitable dynamic range to be achieved. In some instances, the digital pixel architecture of this disclosure may achieve similar or even higher dynamic ranges compared to a conventional pure digital pixel architecture. Further, the digital pixel architecture of this disclosure may be implemented in smaller areas compared to a conventional pure digital pixel architecture, which can allow an array of digital pixels to be produced in a smaller package or allow more digital pixels to be included in an array within a specified package size. In addition, this approach can be replicated across a number of digital pixels and used independently, such as when a focal plane array or other collection includes multiple digital pixels each having the digital pixel architecture of this disclosure. Here, the data counter in each digital pixel may or may not reach the specified threshold value during a sampling period, so the count value from the data counter in each digital pixel may or may not be scaled during the sampling period (and this can occur independently for each digital pixel). In other words, some digital pixels may saturate and have the count values from their data counters scaled, while other digital pixels may not saturate and require no scaling of the count values from their data counters.

Imaging systems designed in accordance with this disclosure may be used in any suitable applications. For example, imaging systems designed in accordance with this disclosure may be used in digital cameras, video recorders, smartphones, or other electronic devices that can be used to capture still or video images. Imaging systems designed in accordance with this disclosure may be used in commercial and defense-related satellites, aircraft, and drones, such as to produce visible, infrared, or other images of scenes. Imaging systems designed in accordance with this disclosure may be used in telescopes, satellites, or other astronomy-related settings, such as to generate images of planets, stars, galaxies, or other celestial bodies. Imaging systems designed in accordance with this disclosure may be used in robotic systems or other systems intended for use in surgical or industrial settings, such as to generate images of patients undergoing treatment or images of components being fabricated or processed using lasers or other electromagnetic energy. Imaging systems designed in accordance with this disclosure may be used in medical imaging systems, such as to produce images of patients in the presence of x-rays or other electromagnetic energy. In general, the imaging systems designed in accordance with this disclosure may be used in any suitable applications where high fluxes may otherwise interfere with proper operation of the imaging systems. Note that while the description below may describe the digital pixel architecture of this disclosure as being used with a pure digital pixel design (where pulses from the comparator are counted), the same or similar approach may be used in a residue digital pixel design (where pulses from the comparator are counted and where a residual charge stored on the capacitor at the end of each sampling period is digitized and output).

FIG. 1 illustrates an example system 100 supporting the use of a digital pixel architecture having low power and high dynamic range according to this disclosure. As shown in FIG. 1, the system 100 includes a focusing system 102, a focal plane array 104, and a processing system 106. The focusing system 102 generally operates to focus illumination from a scene onto the focal plane array 104. The focusing system 102 may have any suitable field of view that is directed onto the focal plane array 104. The focusing system 102 includes any suitable structure(s) configured to focus illumination, such as one or more lenses, mirrors, or other optical devices.

The focal plane array 104 generally operates to capture image data related to a scene. For example, the focal plane array 104 may include a matrix or other collection of pixel circuit elements that generate and process electrical signals representing a scene. Several of the pixel circuit elements are shown in FIG. 1, although the size of the pixel circuit elements is exaggerated for convenience here. The focal plane array 104 may capture image data in any suitable spectrum or spectra, such as in the visible, infrared, or ultraviolet spectrum. The focal plane array 104 may also have any suitable resolution, such as when the focal plane array 104 includes a collection of approximately 1,000 pixel circuit elements by approximately 1,000 pixel circuit elements (although other collection sizes may be used). The focal plane array 104 includes any suitable collection of pixel circuit elements configured to capture image data. The focal plane array 104 may also include additional components that facilitate the receipt and output of information, such as readout integrated circuits (ROICs).

As described in more detail below, the pixel circuit elements of the focal plane array 104 include photodiodes that capture illumination from a scene and generate electrical currents. For each pixel circuit element, the electrical current can be used to charge a capacitor, and the voltage stored on the capacitor can be compared to a reference voltage by a comparator. The comparator can generate pulses in a digital output whenever the capacitor voltage meets or exceeds the reference voltage. A data counter can be used to count the number of pulses in the digital output from the comparator, and a time counter can be used to count the number of pulses in a clock signal. In some cases, the clock signal may contain nonlinearly-spaced pulses, such as when the pulses in the clock signal have a spacing that increases exponentially during a sampling period. If and when the data counter outputs a count value that meets or exceeds a specified threshold value, the counting of pulses by the data and time counters can be stopped, which allows for extrapolation of a final value based on the count values produced by the data and time counters. In other cases, an analog time counter may be used and stopped if and when the data counter outputs a count value that meets or exceeds the specified threshold value, which also allows for extrapolation of a final value based on the count value produced by the data counter and the time measured by the analog time counter. These approaches support flux-dependent integration time scaling, which can help to reduce power consumption while still achieving suitable dynamic range.

The processing system 106 receives outputs from the focal plane array 104 and processes the information. For example, the processing system 106 may process image data generated by the focal plane array 104 in order to generate visual images for presentation to one or more personnel, such as on a display 108. However, the processing system 106 may use the image data generated by the focal plane array 104 in any other suitable manner. As described below, the processing system 106 may also perform an extrapolation calculation for each pixel circuit element, where the extrapolation calculation allows the processing system 106 to estimate (based on count values from the data and time counters of a pixel circuit element) what the data counter of the pixel circuit element might have counted had the data counter been allowed to count pulses for an entire sampling period. Note, however, that the extrapolation calculation may be performed internally within the focal plane array 104 or by another component of the system 100.

The processing system 106 includes any suitable structure configured to process information from a focal plane array or other imaging system. For instance, the processing system 106 may include one or more processing devices 110, such as one or more microprocessors, microcontrollers, digital signal processors, field programmable gate arrays, application specific integrated circuits, or discrete logic devices. The processing system 106 may also include one or more memories 112, such as a random access memory, read only memory, hard drive, Flash memory, optical disc, or other suitable volatile or non-volatile storage device(s). The processing system 106 may further include one or more interfaces 114 that support communications with other systems or devices, such as a network interface card or a wireless transceiver facilitating communications over a wired or wireless network or a direct connection. The display 108 includes any suitable device configured to graphically present information.

Although FIG. 1 illustrates one example of a system 100 supporting the use of a digital pixel architecture having low power and high dynamic range, various changes may be made to FIG. 1. For example, various components in FIG. 1 may be combined, further subdivided, replicated, omitted, or rearranged and additional components may be added according to particular needs. Also, FIG. 1 illustrates one example type of system in which a digital pixel architecture having low power and high dynamic range may be used. However, the digital pixel architecture may be used in any other suitable device or system.

Figure 2:
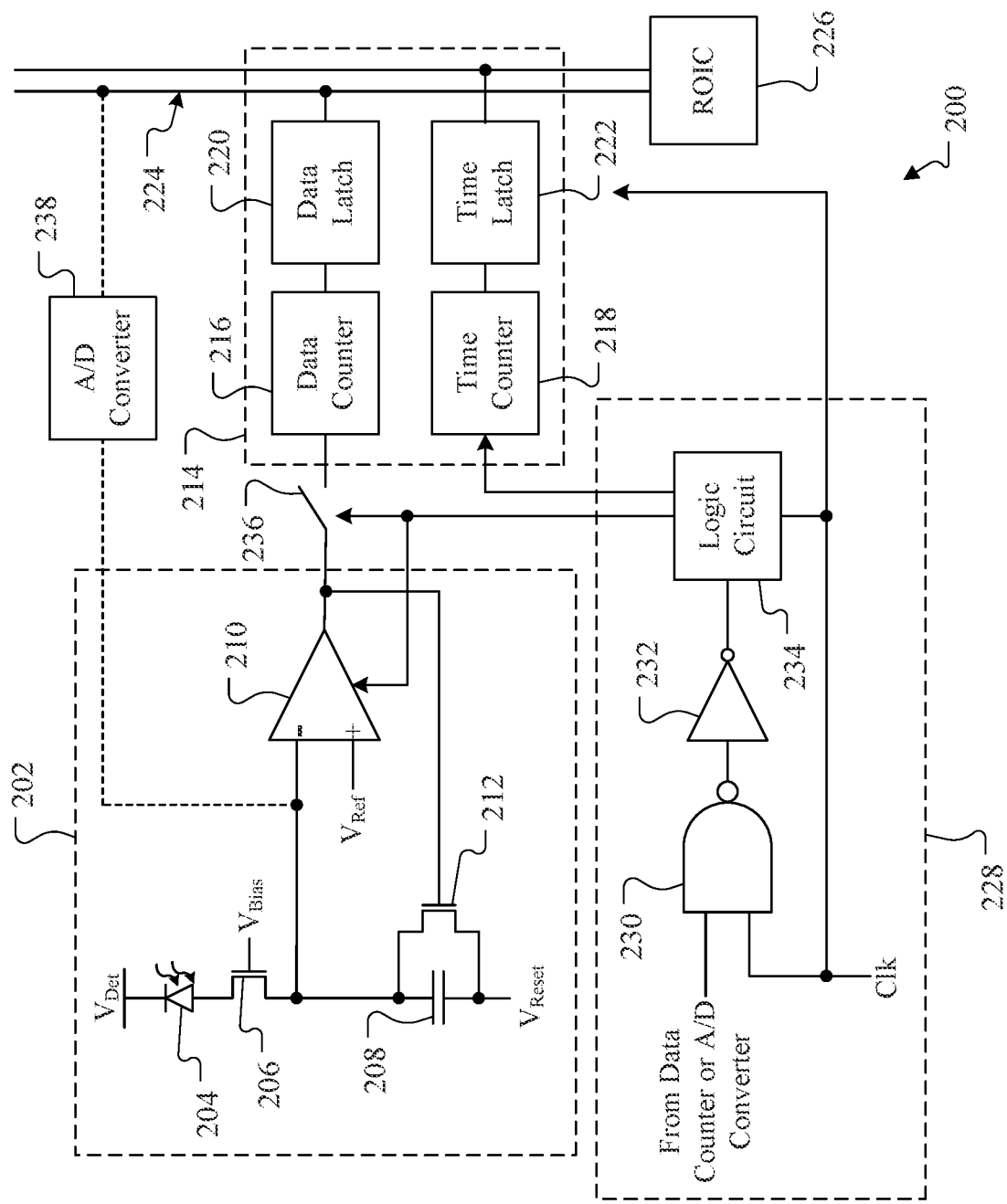
FIG. 2 illustrates an example circuit supporting a digital pixel architecture having low power and high dynamic range according to this disclosure.

FIG. 2 illustrates an example circuit 200 supporting a digital pixel architecture having low power and high dynamic range according to this disclosure. An instance of the circuit 200 shown in FIG. 2 may, for example, represent (or be used as at least part of) each pixel circuit element of the focal plane array 104 in the system 100 shown in FIG. 1. Thus, different pixel circuit elements of the focal plane array 104 may include different instances of the circuit 200 shown in FIG. 2. However, any number of the circuits 200 may be used with any other suitable device and in any other suitable system.

As shown in FIG. 2, the circuit 200 includes an analog front-end 202. The analog front-end 202 here includes a photodetector 204, which generally operates to produce an electrical current based on received illumination. The photodetector 204 includes any suitable structure configured to generate an electrical current based on received illumination, such as a photodiode. In some cases, the photodetector 204 may represent a photodiode or other structure that can sense illumination in a specified wavelength range or band, such as in the visible, infrared, or ultraviolet spectrum. The photodetector 204 here is coupled to receive a detector voltage $V_{Det}$, which may be provided by any suitable voltage source.

Generation of the electrical current by the photodetector 204 is controlled using a switch 206, which in this example is implemented using a transistor. A gate of the transistor forming the switch 206 receives a bias voltage $V_{Bias}$, which may be provided by any suitable voltage source. When permitted by the switch 206, the electrical current generated by the photodetector 204 is provided to a capacitor 208, which can store an electrical charge that varies based on the electrical current received by the capacitor 208 from the photodetector 204. The voltage stored on the capacitor 208 is provided to a comparator 210, which also receives a reference voltage $V_{Ref}$ (which may be provided by any suitable voltage source). The comparator 210 compares the voltage stored on the capacitor 208 and the reference voltage $V_{Ref}$ and generates a digital output based on the comparison. For example, when the capacitor voltage meets or exceeds the reference voltage $V_{Ref}$, the comparator 210 can toggle its output, such as by toggling from a low logic signal to a high logic signal. The output from the comparator 210 is used to control a switch 212, which in this example is implemented using a transistor and is coupled in parallel across the capacitor 208. Closing the switch 212 short-circuits or bypasses the capacitor 208, which allows the capacitor 208 to be discharged until the electrical charge stored on the capacitor 208 is equivalent to a reset voltage $V_{Reset}$. The reset voltage $V_{Reset}$ may be provided by any suitable voltage source or may represent a ground voltage.

In this configuration, the capacitor 208 may initially have a voltage equivalent to the reset voltage $V_{Reset}$ at the beginning of a sampling period. The switch 206 may be closed at the beginning of the sampling period, and the photodetector 204 can provide electrical current to the capacitor 208 during the sampling period. This charges the capacitor 208, and the charging can continue until the voltage on the capacitor 208 meets or exceeds the reference voltage $V_{Ref}$. When this occurs, the comparator 210 toggles its output, which closes the switch 212 and discharges the capacitor 208. The discharging causes the stored voltage on the capacitor 208 to drop below the reference voltage $V_{Ref}$, which causes the comparator 210 to toggle its output again (creating a pulse in the comparator's digital output). This causes the switch 212 to open, and the capacitor 208 can again be charged using the electrical current from the photodetector 204. This can occur any number of times during the sampling period, which causes the comparator 210 to generate a series of relatively-narrow pulses at a pulse rate that is proportional to the amount of photocurrent generated by the photodetector 204. The sampling period can also be repeated any number of times as needed or desired.

The circuit 200 also includes a data generation section 214, which generally operates to produce information defining the amount of illumination or flux received by the photodetector 204 during each sampling period. In this example, the data generation section 214 includes a data counter 216 and a time counter 218. Each counter 216 and 218 may be configured to count pulses in an associated input signal. In this example, the data counter 216 is used to count the number of pulses contained in the digital output generated by the comparator 210, which allows the data counter 216 to accumulate the pulses contained in the digital output from the comparator 210 and store/output the accumulated value. Also, in this example, the time counter 218 is used to count the number of pulses contained in a clock signal Clk, which allows the time counter 218 to accumulate the pulses in the clock signal Clk and store/output the accumulated value. Each counter 216 and 218 represents any suitable structure configured to count pulses. In some embodiments, the data counter 216 represents a higher-resolution counter than the time counter 218. In particular embodiments, the data counter 216 represents a 14-bit or 15-bit counter, and the time counter 218 represents a 3-bit or 4-bit counter. Note, however, that these resolutions are examples only and can vary as needed or desired.

A data latch 220 is coupled to the output of the data counter 216, and a time latch 222 is coupled to the output of the time counter 218. Each latch 220 and 222 is configured to receive and hold information that is output from the corresponding counter 216 and 218. For example, each latch 220 and 222 may receive, hold, and output the count value or other information obtained from the corresponding counter 216 and 218 until the latch 220 and 222 is triggered to receive, hold, and output a subsequent count value or other information obtained from the corresponding counter 216 and 218. In this example, each latch 220 and 222 can be controlled using the clock signal Clk, so each latch 220 and 222 can sample and hold the count value or other information that is obtained from the corresponding counter 216 and 218 at the time that a pulse is received in the clock signal Clk. Each latch 220 and 222 includes any suitable structure configured to sample and hold a count value or other information.

In this example, the latches 220 and 222 output latched count values or other latched information from the counters 216 and 218 over different column lines 224, each of which represents an electrical conductor that can be coupled to multiple pixel circuit elements and a readout integrated circuit (ROIC) 226 or other component(s). For example, multiplexing or other circuitry can be used to enable outputs from multiple pixel circuit elements to be obtained over the same column lines 224. The focal plane array 104 may include any suitable number of column lines 224, each of which may be coupled to any suitable number of pixel circuit elements. Note, however, that the use of column lines 224 is optional, and outputs of the pixel circuit elements may be obtained in any other suitable manner. The ROIC 226 can provide obtained information (or information derived from the obtained information) to any suitable destination(s), such as the processing system 106.

The circuit 200 further includes a controller 228, which generally operates to control how the data generation section 214 operates to produce information that is output to the ROIC 226. In this example, the controller 228 includes a NAND gate 230 and an inverter 232 coupled in series (which may be replaced by an AND gate or other suitable circuitry). The NAND gate 230 here receives the clock signal Clk and at least one bit output from the data counter 216. For example, in some embodiments, the NAND gate 230 receives the most-significant bit output from the data counter 216. In other embodiments, the NAND gate 230 receives the second-most-significant bit output from the data counter 216. The NAND gate 230 produces a digital logic value by performing a logical NAND operation using its inputs, meaning the NAND gate 230 produces a low logic value as an output when both of its inputs are high and produces a high logic value as an output otherwise. The inverter 232 operates to invert the digital logic value output by the NAND gate 230.

A logic circuit 234 uses the digital logic value generated using the NAND gate 230 and the inverter 232 (or other suitable circuitry) to control counting operations or other operations in the circuit 200. For example, the logic circuit 234 can be used to selectively apply the clock signal Clk to the time counter 218 and to selectively control the comparator 210 and/or a switch 236 (such as a transistor) coupling the comparator 210 to the data counter 216. As a particular example, at the beginning of each sampling period, the switch 236 may be closed and/or the comparator 210 may be enabled by the logic circuit 234, and the logic circuit 234 can provide the clock signal Clk to the time counter 218. While operating during low or normal flux conditions, the data counter 216 may count relatively fewer pulses from the comparator 210, and the NAND gate 230 may receive a low bit from the data counter 216. Due to the low bit from the data counter 216, the logic circuit 234 may receive a low logic value from the inverter 232, and the logic circuit 234 may keep the switch 236 closed and/or keep the comparator 210 enabled. The logic circuit 234 may also continue providing the clock signal Clk to the time counter 218 so that the time counter 218 can count pulses in the clock signal Clk.

Assuming the low bit is always received from the data counter 216 during a sampling period, the switch 236 can remain closed and/or the comparator 210 can remain enabled. As a result, the data counter 216 can count pulses from the comparator 210 during the entire duration of the sampling period, and the time counter 218 can count pulses in the clock signal Clk during the entire duration of the sampling period. Here, the ROIC 226 may read out the latched count values from the latches 220 and 222, determine that the count value from the time latch 222 indicates that the data counter 216 counted for the entire sampling period, and output the latched count value from the data latch 220 as the output of the circuit 200 for that sampling period.

If the bit from the data counter 216 goes high and eventually matches a pulse in the clock signal Clk during a sampling period, this is indicative that the count value from the data counter 216 has met or exceeded a threshold value, and the NAND gate 230 and inverter 232 will produce a different logic value during the duration of the pulse in the clock signal Clk. As a result, the logic circuit 234 may receive a high logic value from the inverter 232, and the logic circuit 234 may open the switch 236 and/or disable the comparator 210. The logic circuit 234 may also stop providing the clock signal Clk to the time counter 218 so that the time counter 218 can no longer count pulses in the clock signal Clk. Because of this, the data counter 216 can count pulses from the comparator 210 during only a portion of the sampling period, and the time counter 218 can count pulses in the clock signal Clk during only a portion of the sampling period. Here, the ROIC 226 may read out the latched count values from the latches 220 and 222, determine that the count value from the time latch 222 indicates that the data counter 216 counted for part but not all of the sampling period, and scale the latched count value from the data latch 220 based on how long the count value from the time latch 222 indicates that the data counter 216 counted. The ROIC 226 can output the scaled value as the output of the circuit 200 for that sampling period.

Effectively, the time counter 218 here is used as a digital timer, and the output of the time latch 222 here is used as a timestamp to estimate when the data counter 216 stops counting pulses from the comparator 210 during each sampling period. This allows the ROIC 226 to estimate how much the latched count value from the data latch 220 should be scaled in order to produce an estimate of what the count value from the data counter 216 might have been had the data counter 216 been allowed to count pulses from the comparator 210 for the entire sampling period.

Depending on the implementation, this design may be used to achieve similar or higher dynamic ranges compared to conventional digital pixel designs. For example, in some embodiments, the data counter 216 can represent a 15-bit counter, and the time counter 218 can represent a 3-bit counter. In this case, a count value from the 15-bit data counter 216 may remain unchanged or be multiplied by one of different seven values (2, 4, 8, 16, 32, 64, or 128) depending on how quickly the 3-bit time counter 218 stops counting during a sampling period. As a result, the combined 18 bits of the counters 216 and 218 may be used to achieve a 22-bit dynamic range, which can be equivalent to the dynamic range of conventional 22-bit digital pixel designs. While the circuit 200 may have more noise due to the scaling, the circuit 200 can be implemented using a smaller area than the conventional 22-bit digital pixel designs. Note that other dynamic ranges can also be achieved, such as when the data counter 216 represents a 14-bit counter and the time counter 218 represents a 4-bit counter (which may be used to achieve a 28-bit dynamic range). Moreover, the circuit 200 may achieve significantly-reduced power consumption in the presence of high fluxes compared to conventional pure digital pixel designs. As a particular example, the circuit 200 might have a power consumption of around 0.5 watts regardless of the incoming flux, while conventional pure digital pixel designs might have a power consumption of up to 10 watts or more in the presence of high fluxes.

In some embodiments, the time counter 218 may be reset to a minimum value (such as zero) and count forwards based on the pulses received in the clock signal Clk. In these cases, the ROIC 226 may determine whether the latched count value from the time latch 222 reaches a maximum value (such as seven or fifteen) during a sampling period. If so, this indicates that the logic circuit 234 may not have stopped the data counter 216 from counting pulses during the sampling period, and no modification of the latched count value from the data latch 220 is needed for that sampling period. If not, this indicates that the logic circuit 234 stopped the data counter 216 from counting pulses at some point during the sampling period prior to at least one pulse in the clock signal Clk. In that case, the ROIC 226 may subtract the latched count value obtained from the time latch 222 from the maximum value to obtain a value of N and multiply the latched count value obtained from the data latch 220 by $2^N$ to scale the latched count value from the data latch 220.

In other embodiments, the time counter 218 may be reset to a maximum value (such as seven or fifteen) and count backwards based on the pulses received in the clock signal Clk. In these cases, the ROIC 226 may determine whether the latched count value from the time latch 222 reaches a minimum value (such as zero) during a sampling period. If so, this indicates that the logic circuit 234 may not have stopped the data counter 216 from counting pulses during the sampling period, and no modification of the latched count value from the data latch 220 is needed for that sampling period. If not, this indicates that the logic circuit 234 stopped the data counter 216 from counting pulses at some point during the sampling period prior to at least one pulse in the clock signal Clk. In that case, the ROIC 226 may use the latched count value obtained from the time latch 222 as the value of N and multiply the latched count value obtained from the data latch 220 by $2^N$ to scale the latched count value from the data latch 220.

In still other embodiments, rather than using the time counter 218 as a digital timer, the time counter 218 may be replaced by an analog timer, which is configured to measure a period of time (such as between start and end periods defined by pulses). In these embodiments, the analog time counter 218 may begin measuring time at the start of a sampling period and stop measuring time either (i) at the end of the sampling period or (ii) when the logic circuit 234 detects that the count value from the data counter 216 meets or exceeds the specified threshold value. Here, for instance, the logic circuit 234 can start the time counter 218 by sending an initial pulse to the time counter 218 and subsequently stop the time counter 218 by sending another pulse to the time counter 218. The ROIC 226 can obtain the amount of time measured by the analog time counter 218, compare the measured amount of time to the total duration of the sampling period, and (if necessary) scale the latched count value provided by the data latch 220. If an analog time counter 218 is used, a time measurement from the analog time counter 218 may or may not be latched using the time latch 222.

Note that while the generation of data values has been described above as being performed using the data counter 216 and the data latch 220, other approaches may be used to generate data based on the accumulated charge on the capacitor 208. For example, in other embodiments, the comparator 210 and data counter 216 (and possibly the data latch 220) may be omitted, and the voltage generated using the capacitor 208 may be provided to an analog-to-digital (A/D) converter 238. The A/D converter 238 generally operates to convert analog voltage values from the capacitor 208 into digital values, which can be output over one of the column lines 224. In these embodiments, at least one bit generated by the A/D converter 238 (such as the most-significant bit or the second-most-significant bit output by the A/D converter 238) can be provided to the controller 228 for use in detecting when the voltage from the capacitor 208 exceeds a threshold (which can be determined at each pulse in the clock signal Clk). When the threshold is exceeded, the controller 228 may cause the A/D converter 238 to stop generating new digital values and hold the digital value produced at the time when the threshold is detected as being exceeded. If the A/D converter 238 cannot hold its own output, the data latch 220 may be coupled between the A/D converter 238 and the associated column line 224, and the controller 228 can trigger the data latch 220 to sample and hold the output of the A/D converter 238. In these cases, when the threshold is exceeded during the sampling period, the output of the A/D converter 238 can be scaled using the latched count value from the data latch 220 in the same manner described above to obtain a final value indicative of the received illumination for that sampling period.

In addition, it is possible for a combination of these approaches to be used, such as when the data counter 216 and the data latch 220 are used to generate data and the A/D converter 238 is separately used to sense the residue on the capacitor 208 at the end of a sampling period. In this case, the A/D converter 238 may be coupled to a third column line 224 in order to support separate readouts of the values provided by the data latch 220 and the A/D converter 238. If necessary, a separate latch may be positioned after the A/D converter 238 in order to sample and hold the output of the A/D converter 238.

Although FIG. 2 illustrates one example of a circuit 200 supporting a digital pixel architecture having low power and high dynamic range, various changes may be made to FIG. 2. For example, any of the circuit components shown in FIG. 2 may be replaced by different circuit components performing the same or similar function(s). Also, any additional components may be used with the circuit 200 to support other desired functions. In addition, while the ROIC 226 is described as scaling the count value from the data counter 216 based on the output from the time counter 218 if needed, this may be performed by any other suitable component or components (such as the processing system 106).

Figure 3:
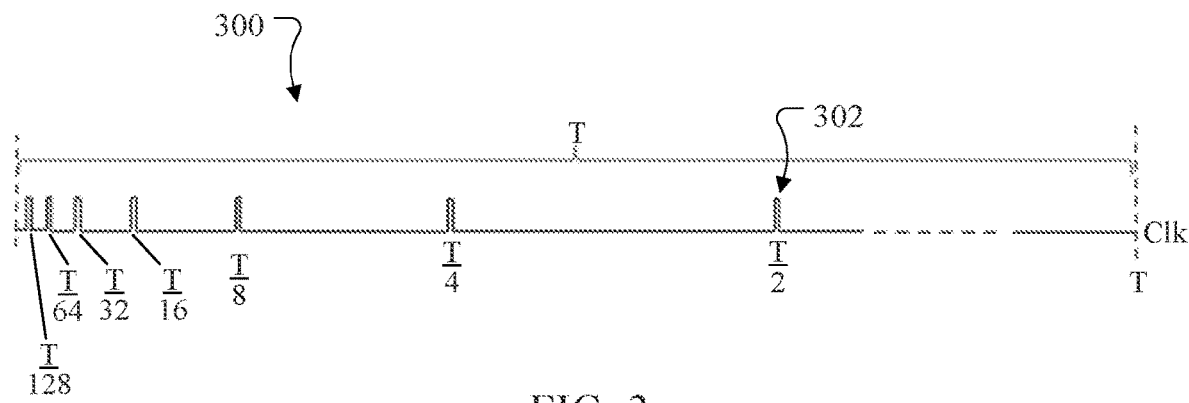
FIG. 3 illustrates example nonlinear sampling in a digital pixel architecture having low power and high dynamic range according to this disclosure.

FIG. 3 illustrates example nonlinear sampling 300 in a digital pixel architecture having low power and high dynamic range according to this disclosure. In particular, the nonlinear sampling 300 shown here may be supported using the clock signal Clk in the circuit 200 of FIG. 2. However, the circuit 200 of FIG. 2 may use any other suitable clock signal supporting any other suitable linear or nonlinear sampling scheme.

As shown in FIG. 3, the clock signal Clk includes a number of pulses 302 within a specified time period T. The specified time period T here can represent the total duration of one sampling period, and the same pattern of pulses 302 may be repeated in any number of sampling periods. In this example, the pulses 302 have a nonlinear spacing, which means that the spacing between adjacent pulses 302 is not consistent throughout the time period T. In this particular example, the nonlinear spacing represents an exponentially-increasing spacing. That is, a first pulse 302 occurs at a time T/128 within the sampling period, a second pulse occurs at a time T/64 within the sampling period, a third pulse occurs at a time T/32 within the sampling period, and a fourth pulse occurs at a time T/16 within the sampling period. A fifth pulse 302 occurs at a time T/8 within the sampling period, a sixth pulse occurs at a time T/4 within the sampling period, and a seventh pulse occurs at a time T/2 within the sampling period. This type of arrangement may be used when the time counter 218 represents a 3-bit counter, although other arrangements may be used with other embodiments of the time counter 218. For instance, if the time counter 218 represents a 4-bit counter, additional pulses 302 may occur at times T/256, T/512, etc. within the sampling period.

Using this type of clock signal Clk, the time counter 218 may be used to count the received pulses 302. If low or normal flux conditions exist (at least for a specific pixel circuit element), the data counter 216 in that pixel circuit element may not output a count value that meets or exceeds the specified threshold, and the time counter 218 in that pixel circuit element may count all pulses 302 contained in the clock signal Clk during a sampling period. The ROIC 226 can therefore output the latched count value from the data latch 220 as the output for that sampling period, and no scaling may need to be performed.

If high flux conditions exist (at least for a specific pixel circuit element), the data counter 216 in that pixel circuit element may output a count value that meets or exceeds the specified threshold, and the time counter 218 in that pixel circuit element may count fewer than all pulses 302 contained in the clock signal Clk during a sampling period. The ROIC 226 can therefore identify this condition and scale the latched count value from the data latch 220, and the ROIC 226 can use the scaled value as the output for that sampling period.

Note that the use of an exponentially-increasing spacing of the pulses 302 may enable simpler scaling of the latched count value from the data latch 220 by the ROIC 226. For example, the ROIC 226 can perform $2^N$ scaling by performing a left-shift of a data value by N bits. However, this need not be the case. The pulses 302 may have any other suitable linear or nonlinear spacing, and the ROIC 226 can be configured to perform any suitable scaling based on the known numbers and positions of the pulses 302. Moreover, if the time counter 218 is implemented as an analog time counter, the ROIC 226 can be configured to perform suitable scaling based on a ratio of the specified time period T (representing the total duration of the sampling period) and the amount of time as measured by the analog time counter 218.

Although FIG. 3 illustrates one example of nonlinear sampling 300 in a digital pixel architecture having low power and high dynamic range, various changes may be made to FIG. 3. For example, any other suitable clock signal Clk may be used here, or analog time measurements may be used by the time counter 218. Also, while the ROIC 226 is described as scaling the count value from the data counter 216 based on the output from the time counter 218 if needed, this may be performed by any other suitable component or components (such as the processing system 106).

Figure 4:
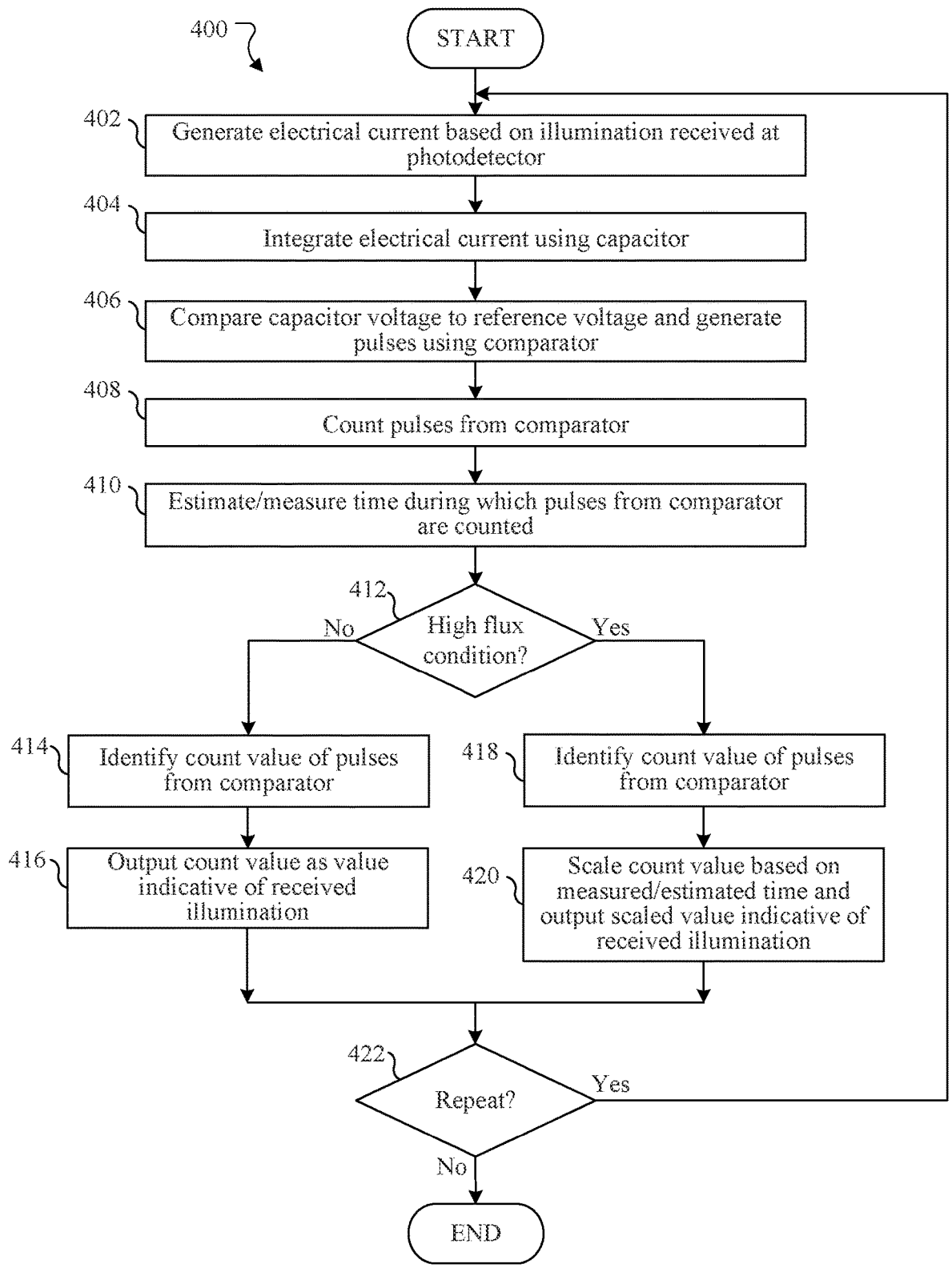
FIG. 4 illustrates an example method for using a digital pixel architecture having low power and high dynamic range according to this disclosure.

FIG. 4 illustrates an example method 400 for using a digital pixel architecture having low power and high dynamic range according to this disclosure. For ease of explanation, the method 400 is described as being performed using the circuit 200 of FIG. 2 in the system 100 of FIG. 1. However, the method 400 may be performed using any other suitable circuit and in any other suitable system.

As shown in FIG. 4, an electrical current is generated based on illumination received at a photodetector at step 402. This may include, for example, the photodetector 204 generating an electrical current based on received illumination. A capacitor is used to integrate the electrical current at step 404. This may include, for example, the capacitor 208 receiving the electrical current from the photodetector 204 and storing electrical energy based on the electrical current. The voltage stored on the capacitor is compared to a reference voltage in order to generate pulses during integration of the electrical current using a comparator at step 406. This may include, for example, the comparator 210 comparing the voltage stored on the capacitor 208 with the reference voltage $V_{Ref}$. This may also include the comparator 210 toggling its output when the voltage stored on the capacitor 208 equals or exceeds the reference voltage $V_{Ref}$, which can cause the capacitor 208 to reset and thereby cause the comparator 210 to toggle its output again (producing a pulse).

Pulses from the comparator are counted at step 408. This may include, for example, the data counter 216 counting the number of pulses contained in the digital output from the comparator 210 during a sampling period. An estimation or measurement of the amount of time during the sampling period in which the pulses from the comparator are counted is made at step 410. This may include, for example, the time counter 218 counting the number of pulses 302 received in a clock signal Clk, where the time counter 218 can count the number of pulses 302 in the clock signal Clk unless and until the data counter 216 outputs a count value that meets or exceeds a specified threshold value. This may alternatively include the time counter 218 measuring the amount of time that elapses between the start of the sampling period and the time at which the data counter 216 outputs a count value that meets or exceeds the specified threshold value.

If a high flux condition is not occurring at step 412, the count value representing the number of pulses counted during the sampling period is identified at step 414 and output as a value indicative of the received illumination at step 416. This may include, for example, the data latch 220 latching the count value output from the data counter 216 at the end of the sampling period. This may also optionally include the time latch 222 latching the count value or other information output from the time counter 218 at the end of the sampling period. This may further include the ROIC 226 retrieving the data and time information and determining that the information from the time counter 218 indicates that the data counter 216 did not generate a count value that met or exceeded the specified threshold value during the sampling period. In other embodiments, the ROIC 226 may pass the obtained information to the processing system 106, and the processing system 106 may process the information and determine that scaling is not needed.

If a high flux condition is occurring at step 412, the count value representing the number of pulses counted during the sampling period is identified at step 418 and is scaled to produce a value indicative of the received illumination at step 420. This may include, for example, the data latch 220 latching the count value output from the data counter 216 at the end of the sampling period. This may also optionally include the time latch 222 latching the count value or other information output from the time counter 218 at the end of the sampling period. This may further include the ROIC 226 retrieving the data and time information and determining that the information from the time counter 218 indicates that the data counter 216 did generate a count value that met or exceeded the specified threshold value during the sampling period. The ROIC 226 can scale the count value generated by the data latch 220 based on the information from the time counter 218, such as by shifting the count value generated by the data latch 220. The ROIC 226 can output the scaled value as being indicative of the received illumination. In other embodiments, the ROIC 226 may pass the obtained information to the processing system 106, and the processing system 106 may process the information, determine that scaling is needed, and perform the scaling.

A determination is made whether to repeat the process at step 422. This may include, for example, determining whether another sampling period is needed. If so, the process returns to step 402. Otherwise, the process ends. Note that the image information captured using the method 400 may be used in any suitable manner, such as to generate images for display or other use. Also note that the method 400 shown here may be performed for each pixel circuit element of a focal plane array 104 or other device, and each pixel circuit element may operate independently. In addition, note that the determination whether or not scaling is used can occur dynamically based on the scene being imaged. Thus, each pixel circuit element can make its own determination whether or not scaling is used, and scaling may or may not be used during each sampling period of each pixel circuit element.

Although FIG. 4 illustrates one example of a method 400 for using a digital pixel architecture having low power and high dynamic range, various changes may be made to FIG. 4. For example, while shown as a series of steps, various steps in FIG. 4 may overlap, occur in parallel, occur in a different order, or occur any number of times (including zero times). Also, various additional functions may occur within each pixel circuit element or across multiple pixel circuit elements. For instance, deselect logic may be implemented to selectively deactivate certain pixel circuit elements, such as when faulty pixel circuit elements are deactivated to avoid their use when generating images or otherwise collecting image data. In addition, as noted above, counting pulses from the comparator 208 is one mechanism for measuring received illumination, but other approaches may also be used. For instance, the voltage on the capacitor 208 can be used as the indicator of received illumination, such as when the A/D converter 238 digitizes the voltage on the capacitor 208.

The following describes example embodiments of this disclosure that implement or relate to a digital pixel architecture having low power and high dynamic range. However, other embodiments may be used in accordance with the teachings of this disclosure.

In a first embodiment, an apparatus includes a photodetector configured to generate an electrical current based on received illumination. The apparatus also includes a capacitor configured to be charged by the electrical current and generate a voltage. The apparatus further includes a controller configured to sense whether the voltage on the capacitor exceeds a threshold during a sampling period. In addition, the apparatus includes a timer configured to generate an estimate or measure of an amount of time within the sampling period during which the voltage on the capacitor does not exceed the threshold.

Any single one or any suitable combination of the following features may be used with the first embodiment. The timer may include a counter configured to count a number of pulses in a clock signal, the pulses in the clock signal may have an exponentially-increasing spacing during the sampling period, and the counter may be configured to stop counting the pulses in the clock signal in response to the controller detecting that the voltage on the capacitor exceeds the threshold. The controller may be configured to receive the clock signal and at least one bit of a digital value representing the voltage on the capacitor, and the controller may be configured to selectively pass the clock signal to the counter or block the clock signal from the counter based on the at least one bit of the digital value. The apparatus may include a comparator configured to generate pulses in a digital output based on the voltage on the capacitor, and a counter configured to count the pulses in the digital output of the comparator during the sampling period. The controller may be further configured to cause the counter to stop counting the pulses in the digital output of the comparator in response to detecting that the voltage on the capacitor exceeds the threshold. The controller may be configured to detect that the voltage on the capacitor exceeds the threshold based on a most-significant bit or a second-most-significant bit of a count value generated by the counter. The apparatus may include a switch coupling the comparator and the counter, and the controller may be configured to selectively open or close the switch depending on whether the voltage on the capacitor exceeds the threshold. The apparatus may include an A/D converter configured to generate a digital value based on the voltage on the capacitor, and the controller may be configured to detect that the voltage on the capacitor exceeds the threshold based on the digital value from the A/D converter. The apparatus may include a readout integrated circuit configured to scale a value indicative of the received illumination based on the estimate or measure of the amount of time within the sampling period during which the voltage on the capacitor did not exceed the threshold. The apparatus may include a processing system configured to scale a value indicative of the received illumination based on the estimate or measure of the amount of time within the sampling period during which the voltage on the capacitor did not exceed the threshold.

In a second embodiment, a system includes a focal plane array having multiple pixel circuit elements. Each pixel circuit element includes a photodetector configured to generate an electrical current based on received illumination. Each pixel circuit element also includes a capacitor configured to be charged by the electrical current and generate a voltage. Each pixel circuit element further includes a controller configured to sense whether the voltage on the capacitor exceeds a threshold during a sampling period. In addition, each pixel circuit element includes a timer configured to generate an estimate or measure of an amount of time within the sampling period during which the voltage on the capacitor does not exceed the threshold.

Any single one or any suitable combination of the following features may be used with the second embodiment. In each pixel circuit element, the timer may include a counter configured to count a number of pulses in a clock signal, the pulses in the clock signal may have an exponentially-increasing spacing during the sampling period, and the counter may be configured to stop counting the pulses in the clock signal in response to the controller detecting that the voltage on the capacitor exceeds the threshold. In each pixel circuit element, the controller may be configured to receive the clock signal and at least one bit of a digital value representing the voltage on the capacitor, and the controller may be configured to selectively pass the clock signal to the counter or block the clock signal from the counter based on the at least one bit of the digital value. Each pixel circuit element may include a comparator configured to generate pulses in a digital output based on the voltage on the capacitor and a counter configured to count the pulses in the digital output of the comparator during the sampling period. The controller may be further configured to cause the counter to stop counting the pulses in the digital output of the comparator in response to detecting that the voltage on the capacitor exceeds the threshold. In each pixel circuit element, the controller may be configured to detect that the voltage on the capacitor exceeds the threshold based on a most-significant bit or a second-most-significant bit of a count value generated by the counter. In each pixel circuit element, the pixel circuit element may include a switch coupling the comparator and the counter, and the controller may be configured to selectively open or close the switch depending on whether the voltage on the capacitor exceeds the threshold. In each pixel circuit element, the pixel circuit element may include an A/D converter configured to generate a digital value based on the voltage on the capacitor, and the controller may be configured to detect that the voltage on the capacitor exceeds the threshold based on the digital value from the A/D converter. Each pixel circuit element may include a readout integrated circuit configured to scale a value indicative of the received illumination based on the estimate or measure of the amount of time within the sampling period during which the voltage on the capacitor did not exceed the threshold. The system may include a processing system configured to scale a value indicative of the received illumination based on the estimate or measure of the amount of time within the sampling period during which the voltage on the capacitor did not exceed the threshold. Each pixel circuit element may be configured to operate independently of other pixel circuit elements.

In a third embodiment, a method includes generating an electrical current based on received illumination. The method also includes charging a capacitor using the electrical current to generate a voltage and measuring the received illumination during a sampling period. The method further includes sensing that the voltage on the capacitor exceeds a threshold during the sampling period and generating an estimate or measure of an amount of time within the sampling period during which the voltage on the capacitor does not exceed the threshold. In addition, the method includes generating a final value indicative of the received illumination based on the measuring of the received illumination and the estimate or measure of the amount of time within the sampling period during which the voltage on the capacitor does not exceed the threshold. Any single one or any suitable combination of the features described in the preceding paragraphs may be used with the third embodiment.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a photodetector configured to generate an electrical current based on received illumination;
a capacitor configured to be charged by the electrical current and generate a voltage;
a controller configured to detect whether the voltage on the capacitor exceeds a threshold during a sampling period; and
a timer configured to generate an estimate or measure of an amount of time within the sampling period during which the voltage on the capacitor does not exceed the threshold;
wherein the timer comprises a counter configured to count a number of pulses in a clock signal and to stop counting the pulses in the clock signal in response to the controller detecting that the voltage on the capacitor exceeds the threshold, the pulses in the clock signal having an exponentially-increasing spacing during the sampling period.

2. The apparatus of claim 1, wherein the controller is further configured to:
receive the clock signal and at least one bit of a digital value representing the voltage on the capacitor; and
selectively pass the clock signal to the counter or block the clock signal from the counter based on the at least one bit of the digital value.

3. The apparatus of claim 1, further comprising:
a comparator configured to generate the clock signal by generating a digital output based on the voltage on the capacitor.

4. An apparatus comprising:
a photodetector configured to generate an electrical current based on received illumination;
a capacitor configured to be charged by the electrical current and generate a voltage;
a controller configured to detect whether the voltage on the capacitor exceeds a threshold during a sampling period;
a comparator configured to generate pulses in a digital output based on the voltage on the capacitor; and
a counter configured to generate an estimate or measure of an amount of time within the sampling period during which the voltage on the capacitor does not exceed the threshold and to count the pulses in the digital output of the comparator during the sampling period;
wherein the controller is further configured to:
cause the counter to stop counting the pulses in the digital output of the comparator in response to detecting that the voltage on the capacitor exceeds the threshold; and
detect that the voltage on the capacitor exceeds the threshold based on a most-significant bit or a second-most-significant bit of a count value generated by the counter.

5. The apparatus of claim 4, further comprising:
a switch coupling the comparator and the counter;
wherein the controller is further configured to selectively open or close the switch depending on whether the voltage on the capacitor exceeds the threshold.

6. The apparatus of claim 1, further comprising:
an analog-to-digital (A/D) converter configured to generate a digital value based on the voltage on the capacitor;
wherein the controller is further configured to detect that the voltage on the capacitor exceeds the threshold based on the digital value from the A/D converter.

7. The apparatus of claim 1, further comprising:
a readout integrated circuit configured to scale a value indicative of the received illumination based on the estimate or measure of the amount of time within the sampling period during which the voltage on the capacitor did not exceed the threshold.

8. The apparatus of claim 1, further comprising:
a processing system configured to scale a value indicative of the received illumination based on the estimate or measure of the amount of time within the sampling period during which the voltage on the capacitor did not exceed the threshold.

9. A system comprising:
a focal plane array comprising multiple pixel circuit elements;
wherein each pixel circuit element comprises:
a photodetector configured to generate an electrical current based on received illumination;
a capacitor configured to be charged by the electrical current and generate a voltage;
a controller configured to detect whether the voltage on the capacitor exceeds a threshold during a sampling period; and
a timer configured to generate an estimate or measure of an amount of time within the sampling period during which the voltage on the capacitor does not exceed the threshold;
wherein the timer comprises a counter configured to count a number of pulses in a clock signal and to stop counting the pulses in the clock signal in response to the controller detecting that the voltage on the capacitor exceeds the threshold, the pulses in the clock signal having an exponentially-increasing spacing during the sampling period.

10. The system of claim 9, wherein, in each pixel circuit element, the controller is further configured to:
receive the clock signal and at least one bit of a digital value representing the voltage on the capacitor; and
selectively pass the clock signal to the counter or block the clock signal from the counter based on the at least one bit of the digital value.

11. The system of claim 9, wherein each pixel circuit element further comprises:
a comparator configured to generate the clock signal by generating a digital output based on the voltage on the capacitor.

12. The system of claim 11, wherein, in each pixel circuit element, the controller is further configured to detect that the voltage on the capacitor exceeds the threshold based on a most-significant bit or a second-most-significant bit of a count value generated by the counter.

13. The system of claim 11, wherein, in each pixel circuit element:
the pixel circuit element further comprises a switch coupling the comparator and the counter; and
the controller is further configured to selectively open or close the switch depending on whether the voltage on the capacitor exceeds the threshold.

14. The system of claim 9, wherein, in each pixel circuit element:
the pixel circuit element further comprises an analog-to-digital (A/D) converter configured to generate a digital value based on the voltage on the capacitor; and
the controller is further configured to detect that the voltage on the capacitor exceeds the threshold based on the digital value from the A/D converter.

15. The system of claim 9, wherein each pixel circuit element further comprises a readout integrated circuit configured to scale a value indicative of the received illumination based on the estimate or measure of the amount of time within the sampling period during which the voltage on the capacitor did not exceed the threshold.

16. The system of claim 9, further comprising:
a processing system configured to scale a value indicative of the received illumination based on the estimate or measure of the amount of time within the sampling period during which the voltage on the capacitor did not exceed the threshold.

17. The system of claim 9, wherein each pixel circuit element is configured to operate independently of other pixel circuit elements.

18. A method comprising:
generating an electrical current based on received illumination;
charging a capacitor using the electrical current to generate a voltage;
measuring the received illumination during a sampling period;
detecting that the voltage on the capacitor exceeds a threshold during the sampling period;
generating an estimate or measure of an amount of time within the sampling period during which the voltage on the capacitor does not exceed the threshold based on counting a number of pulses in a clock signal until detecting that the voltage on the capacitor exceeds the threshold, the pulses in the clock signal having an exponentially-increasing spacing during the sampling period; and
generating a final value indicative of the received illumination based on the measuring of the received illumination and the estimate or measure of the amount of time within the sampling period during which the voltage on the capacitor does not exceed the threshold.

19. The method of claim 18, wherein detecting that the voltage on the capacitor exceeds the threshold during the sampling period comprises detecting that the voltage on the capacitor exceeds the threshold based on a most-significant bit or a second-most-significant bit of a count value generated by counting the number of pulse signals until detecting that the voltage on the capacitor exceeds the threshold.

20. The method of claim 18, wherein generating the final value indicative of the received illumination comprises scaling the number of pulses counted in the clock signal until detecting that the voltage on the capacitor exceeds the threshold.

* * * * *